United States Patent
Mehta et al.

(10) Patent No.: US 10,257,184 B1
(45) Date of Patent: *Apr. 9, 2019

(54) ASSIGNING POLICIES FOR ACCESSING MULTIPLE COMPUTING RESOURCE SERVICES

(71) Applicant: Amazon Technologies, Inc., Seattle, WA (US)

(72) Inventors: Gaurang Pankaj Mehta, Seattle, WA (US); Shon Kiran Shah, Redmond, WA (US); Neelam Satish Agrawal, Seattle, WA (US); Lawrence Hun-Gi Aung, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 1000 days.

This patent is subject to a terminal disclaimer.

(21) Appl. No.: 14/500,432

(22) Filed: Sep. 29, 2014

(51) Int. Cl.
*H04L 29/06* (2006.01)
*H04L 9/32* (2006.01)
(Continued)

(52) U.S. Cl.
CPC ............ *H04L 63/083* (2013.01); *H04L 63/20* (2013.01); *H04L 67/306* (2013.01)

(58) Field of Classification Search
CPC .... G06F 21/6218; G06F 21/41; G06F 21/604; G06F 2221/2145; G06F 2221/2141;
(Continued)

(56) References Cited

U.S. PATENT DOCUMENTS 5,872,928 A * 2/1999 Lewis ................. H04L 41/0843
709/221
6,055,637 A 4/2000 Hudson et al.
(Continued)

FOREIGN PATENT DOCUMENTS

WO WO 2011/106716 9/2011

OTHER PUBLICATIONS

Bucicoiu, M. Ghideu, M.; Tapus, N.; "Secure cloud video streaming using tokens"; RoEduNet Conference 13th Edition: Networking in Education and Research Joint Event RENAM 8th Conference, 2014; Year: Jan. 2014; pp. 1-6.
(Continued)

*Primary Examiner* — Michael Simitoski
(74) *Attorney, Agent, or Firm* — Knobbe Martens Olson & Bear LLP

(57) ABSTRACT

A centralized policy management may allow for one set of credentials to various applications and services offered by a computing resource service provider or other third-party servers. An entity responsible for the administration of a directory made available through a managed directory service may specify one or more policies for users and/or groups of users that utilize the directory. For example, the managed directory service may include a policy management subsystem that manages a set of policies for users and/or groups of users that controls a level of access to applications and services. Administrators can assign one or more policies to a user or a group of users and users can select one or more policies provided to the user by the administrator when attempting to access an application or service.

20 Claims, 10 Drawing Sheets

(51) Int. Cl.
*H04L 29/08* (2006.01)
*G06Q 10/00* (2012.01)

(58) Field of Classification Search
CPC ... H04L 63/102; H04L 63/0815; H04L 63/20; H04L 63/105; H04L 63/08; H04L 63/0884; H04L 63/104; H04L 63/083; H04L 41/0893; H04L 67/306
See application file for complete search history.

(56) References Cited

U.S. PATENT DOCUMENTS

| | | | |
|---|---|---|---|
| 6,934,706 B1* | 8/2005 | Mancuso | G06F 17/30893 |
| 7,451,477 B2* | 11/2008 | Griffin | G06F 17/30581 |
| | | | 707/E17.032 |
| 8,307,003 B1 | 11/2012 | Sheth et al. | |
| 8,533,796 B1 | 9/2013 | Shenoy et al. | |
| 8,599,723 B1* | 12/2013 | Hecht | H04M 3/56 |
| | | | 370/261 |
| 8,656,471 B1 | 2/2014 | Allen et al. | |
| 8,949,596 B2* | 2/2015 | Yin | H04L 63/0435 |
| | | | 709/219 |
| 2002/0023158 A1* | 2/2002 | Polizzi | G06F 17/30873 |
| | | | 709/227 |
| 2002/0143943 A1 | 10/2002 | Lee et al. | |
| 2003/0105974 A1* | 6/2003 | Griffin | G06F 17/30581 |
| | | | 726/6 |
| 2004/0205152 A1 | 10/2004 | Yasuda et al. | |
| 2004/0260702 A1* | 12/2004 | Cragun | G06F 17/30873 |
| 2005/0081055 A1* | 4/2005 | Patrick | G06F 21/6218 |
| | | | 726/26 |
| 2005/0203993 A1 | 9/2005 | Grobman et al. | |
| 2006/0206510 A1* | 9/2006 | Moulhaud | G06F 21/6218 |
| 2007/0112877 A1 | 5/2007 | Harvey et al. | |
| 2007/0180493 A1* | 8/2007 | Croft | G06F 3/1415 |
| | | | 726/2 |
| 2008/0134286 A1* | 6/2008 | Amdur | G06F 21/604 |
| | | | 726/1 |
| 2008/0140618 A1 | 6/2008 | Kumar | |
| 2009/0089625 A1 | 4/2009 | Kannappan et al. | |
| 2009/0328178 A1 | 12/2009 | McDaniel et al. | |
| 2010/0011117 A1* | 1/2010 | Hristodorescu | H04N 7/24 |
| | | | 709/231 |
| 2010/0017889 A1 | 1/2010 | Newstadt et al. | |
| 2010/0254375 A1 | 10/2010 | Feuerhahn et al. | |
| 2011/0099147 A1 | 4/2011 | McAlister et al. | |
| 2011/0099625 A1* | 4/2011 | Thom | G06F 21/34 |
| | | | 726/18 |
| 2011/0162046 A1* | 6/2011 | Forster | G06F 21/41 |
| | | | 726/4 |
| 2011/0251992 A1 | 10/2011 | Bethlehem et al. | |
| 2011/0296504 A1* | 12/2011 | Burch | H04L 63/0815 |
| | | | 726/6 |
| 2011/0314520 A1 | 12/2011 | Olszewski et al. | |
| 2012/0023554 A1* | 1/2012 | Murgia | H04L 63/102 |
| | | | 726/4 |
| 2012/0185586 A1* | 7/2012 | Olshansky | H04L 41/0893 |
| | | | 709/224 |
| 2012/0233314 A1 | 9/2012 | Jakobsson | |
| 2012/0246738 A1 | 9/2012 | Shah et al. | |
| 2012/0266168 A1 | 10/2012 | Spivak et al. | |
| 2013/0007845 A1 | 1/2013 | Chang et al. | |
| 2013/0042115 A1 | 2/2013 | Sweet et al. | |
| 2013/0066834 A1 | 3/2013 | McAlister et al. | |
| 2013/0174216 A1 | 7/2013 | Simske et al. | |
| 2013/0205028 A1* | 8/2013 | Crockett | G06F 9/5027 |
| | | | 709/226 |
| 2013/0227140 A1 | 8/2013 | Hinton et al. | |
| 2013/0254847 A1 | 9/2013 | Adams et al. | |
| 2013/0283270 A1 | 10/2013 | Holland et al. | |
| 2013/0283298 A1 | 10/2013 | Ali et al. | |
| 2013/0304797 A1* | 11/2013 | Warren | G06Q 40/02 |
| | | | 709/203 |
| 2014/0040993 A1 | 2/2014 | Lorenzo et al. | |
| 2014/0075501 A1 | 3/2014 | Srinivasan et al. | |
| 2014/0281993 A1* | 9/2014 | Hyde | H04N 21/2541 |
| | | | 715/719 |
| 2014/0298398 A1 | 10/2014 | Neely | |
| 2014/0343989 A1* | 11/2014 | Martini | G06Q 10/063118 |
| | | | 705/7.17 |
| 2015/0135257 A1* | 5/2015 | Shah | H04L 63/08 |
| | | | 726/1 |
| 2015/0160956 A1* | 6/2015 | Shah | H04L 63/10 |
| | | | 718/1 |

OTHER PUBLICATIONS

International Search Report and Written Opinion dated Feb. 4, 2015, International Patent Application No. PCT/US2014/064894, filed Nov. 10, 2014, 14 pages.

International Search Report and Written Opinion dated Feb. 19, 2015, International Patent Application No. PCT/US2014/065084, filed Nov. 11, 2014, 15 pages.

International Search Report and Written Opinion dated Feb. 11, 2015, International Patent Application No. PCT/US2014/065081, filed Nov. 11, 2014, 11 pages.

International Search Report and Written Opinion dated Feb. 23, 2015, International Patent Application No. PCT/US2014/065088, filed Nov. 11, 2014, 13 pages.

\* cited by examiner

US 10,257,184 B1

ASSIGNING POLICIES FOR ACCESSING MULTIPLE COMPUTING RESOURCE SERVICES

BACKGROUND

Administrators frequently utilize directory services to create and maintain a directory for user and/or computing resource management and/or for providing access to a variety of computing resources (e.g., file systems, files, users, security policies, network resources, applications, system storage, etc.). The directory service may be implemented in a data server operated by an administrator (e.g., on-premises). The administrator may also manage a plurality of client devices operated by users, each of which shares a network or domain with the data server. To keep client devices secure and to ensure compatibility across the domain, the data server may assign and enforce security policies on the client devices and install or update software running on the client devices.

However, installing, maintaining, and operating the data server can be burdensome. The data server itself may include several computing systems, thus requiring the purchase of expensive hardware and the configuring of complex software. In some cases, dedicated facilities for powering and cooling the data server may be needed as well. Establishing and maintaining connectivity between the data server and the client devices may require the installation of expensive network equipment. Furthermore, additional hardware and/or software may be needed to implement backup and recovery procedures in case the data server fails or data is otherwise lost.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Introduction

Figure 1:
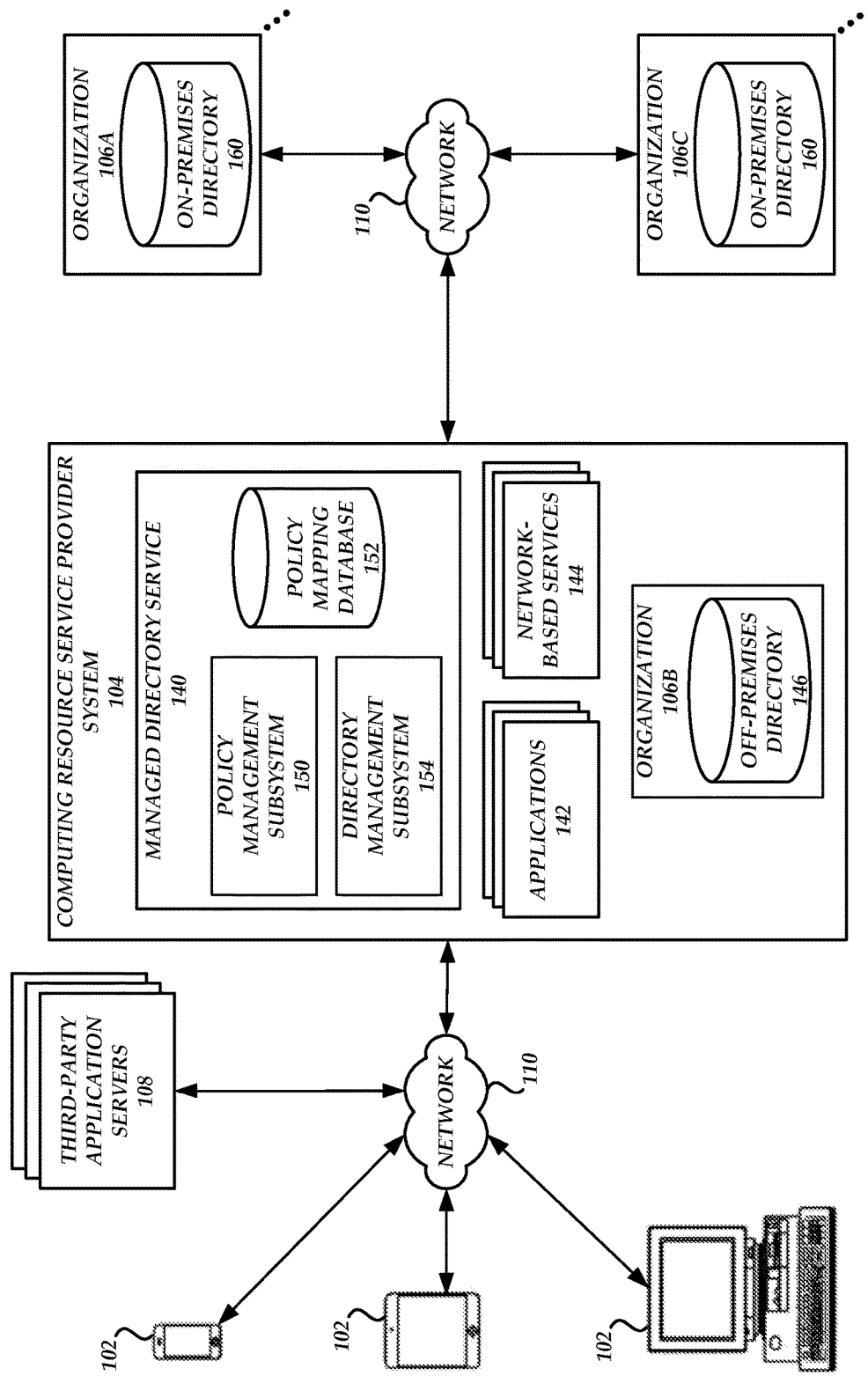
FIG. 1 shows an example network environment in which directory management features of the present disclosure can be implemented according to some embodiments.

As described above, on-premises data servers that implement directory services can be burdensome. Thus, in some conventional systems, a managed directory service (e.g., a system that stores, organizes, and provides access to information in a computer operating system's directory, such as MICROSOFT® ACTIVE DIRECTORY®) can be implemented by a centrally-managed data server that is located remotely and shared by a plurality of administrators and/or organizations. For example, a computing resource service provider may operate the managed directory service. The managed directory service may manage a plurality of directories (e.g., referred to herein as off-premises directories). The centrally-managed data server may provide access to the managed directory service via a network (e.g., the Internet) and an administrator associated with an entity (e.g., an organization) may use existing network-enabled client devices to manage the directory. Accordingly, the entity can implement a directory service without having to install or maintain the infrastructure normally used to implement the directory service.

The administrator associated with the entity may create credentials for users so that the users can access the managed directory service. The administrator may also assign policies to each of the users such that users may have different levels of access to the managed directory service. In some cases, the entity that uses the managed directory service may also have access to other services provided by the computing resource service provider or be a customer of another computing resource service provider that operates other services, such as virtual computer system services, object-based data storage services, database services, and/or the like. The entity may wish to provide its users with access to the managed directory service and/or one or more of the other services. However, because the computer resource service provider that operates the managed directory service and a different computer resource service provider that operates the other services may be located in different regions and may not have access to the same directory, the entity may have to create new credentials and/or policies for its users so that the users can access the services offered by the other computer resource service provider.

Accordingly, a centralized policy management system is described herein such that one set of credentials (e.g., a username and password combination) may be used to access a managed directory service and one or more other services or applications provided by one or more other computing resource service providers. In an embodiment, the entity (e.g., an administrator associated with the entity) responsible for the administration of a directory made available through the managed directory service specifies one or more policies for users and/or groups of users that utilize the directory. For example, the managed directory service may include a policy management subsystem that manages a set of policies for users and/or groups of users. The policies may control access by the users and/or groups of users to applications and/or resources managed by the directory and/or services provided by the other computer resource service provider. Example policies may include policies that prevent a user or a group of users from executing a particular application (e.g., word processing application, photo editing application, etc.) within the directory, policies that prevent a user or a group of users from accessing a virtual computer system service provided by the other computing resource service provider, policies that allow a user or a group of users to only execute read actions on data stored within a database service provided by the other computing resource service provider, and/or the like.

The entity may communicate with the policy management subsystem to access template policies (e.g., preset policies available in the policy management subsystem) and/or custom policies (e.g., created by the entity at a previous or current time) and to assign the policies to one or more users and/or groups. For example, an administrator associated with the entity can select a directory and can select one or more services that are authorized to access the directory. The administrator can then select one or more template policies and/or one or more custom policies and apply the selected policies to one or more users and/or one or more groups that are associated with the directory. Thus, the policy management subsystem may create a mapping of the selected policies with the identity of one or more users and/or one or more groups. This process can be repeated for multiple directories managed by the administrator.

The template and/or custom policies may be stored in a policy database within the managed directory service. The mapping of the policies to users and/or groups may be stored in the policy database or in a separate user database also stored in the managed directory service. The policies and the mappings may be stored in a database in the managed directory service rather than in the entity's directory in case the entity has only provided read-access to its directory.

To access the managed directory service or other services provided by another computing resource service provider, a user may visit a page (e.g., a content or network page, such as a web page) that corresponds with an entity that the end user belongs to. The page may include a list of available applications (e.g., word processing applications, electronic mail applications, photo editing applications, etc.) and/or services (e.g., the managed directory service or other services offered by a computing resource service provider). Alternatively, the user can enter an address that corresponds with a page of a specific application or service. After selecting the desired application or service (or directly visiting the page of the desired application or service), the user may be redirected to a login page. The user can enter his or her credentials, which are then authenticated via the managed directory service.

Once authenticated, the user may view a list of one or more policies that are available for selection. The available policies may be those policies that were applied to the user or to a group that the user is a member of by the administrator. The user may select any number of policies. The ability to select any number of policies may reduce the burdens placed on the administrator. For example the administrator may not have to create personalized, complex policies for each user or group. Rather, the administrator can create a set of simple policies and then assign any number of policies to the users as needed.

After selecting one or more policies, the computing resource service provider may generate a redirect Uniform Resource Identifier (URI) to allow the user to access a computing resource service provider interface that displays features of the selected application(s) or service(s). For example, a user may use the computing resource service provider interface to access a virtual computer system service and request provisioning of a virtual machine instance. The computing resource service provider interface may additionally be customized according to the defined applicable user policies. For instance, if a defined user policy specifies that the user is not permitted to access an object-based data storage service offered by the selected application, the computing resource service provider interface may be configured to not include any authorizations related to this service.

In an embodiment, when the URI is used to access the computing resource service provider interface, the policy management subsystem within the managed directory service obtains the defined user policies to determine the parameters for access to the various services provided by the computing resource service provider. Once the user policies have been obtained, the policy management subsystem may communicate with a credential exchange subsystem associated with the service(s) or application(s) that the user is trying to access, such as through one or more appropriately configured application programming interface (API) calls to the credential exchange subsystem, to request temporary credentials associated with the service(s) or application(s) the user has been granted access to. Accordingly, these temporary credentials may be transmitted to the policy management subsystem in order to provide the user with access to the permissible services and operations. Additionally, the policy management subsystem may further communicate with the credential exchange subsystem to provide the user-specific or group-specific policies that are to be enforced. Once the policy management subsystem has received the temporary sets of credentials and has transmitted the policies to be enforced to the credential exchange subsystem, the policy management subsystem may enable the user to access the customized computing resource service provider interface.

In this manner, a user or a group of users of a directory may use the single set of credentials used to access the directory in order to access one or more other services provided by another computing resource service provider without having to manage additional sets of credentials for these one or more other services. In addition, the techniques described and suggested herein may facilitate additional technical advantages. For example, because the entity may utilize a policy management subsystem within the managed directory service to specify user and/or group policies for any service provided by the other computing resource service provider, the entity may not be required to access any other services or interfaces to specify service-specific user or group policies. This, in turn, may reduce the potential administrative burden on the entity.

System Components

FIG. 1 shows an example network environment in which directory management features of the present disclosure can be implemented according to some embodiments. As used herein, the term "directory" generally refers to an organized collection of data about users, devices, applications, and/or other common resources of a computer network. Each resource on a computer network (or some subset thereof) may be represented as an object in a directory, and information about a particular resource (e.g., name, address, permissions, etc.) can be stored as attributes of that object. Information can be securely stored within or in association with the object such that only users with sufficient permissions are able to access, modify, or otherwise use the information. As used herein, the term "policy" generally refers to a set of rules that governs what applications, services, and/or computing resources a user or a group of users can access, modify, or otherwise use and the extent of the access.

As shown, the network environment includes various user devices 102, a computing resource service provider system 104, organizations 106, and third-party application servers 108 in communication via one or more networks 110. The computing resource service provider system 104 can provide applications, managed directory services, and/or other network-based services to various organizations or other customers. Organizations 106A-C (or other customers) can employ the computing resource service provider system 104 to provide application access to users associated with the organizations, manage the organizations' directories, etc. For example, administrators associated with the organizations 106A-C can use user devices 102 to access the computing resource service provider system 104 to generate policies for individual users or groups of users that govern their access to the various applications or services provided by the computing resource service provider system 104. Individual users can use user devices 102 to select one or more policies and access applications hosted by the computing resource service provider system 104 or other computing resource service providers (e.g., via third-party application servers 108) using credentials from their respective organizations 106A-C according to the selected one or more policies.

The user devices 102 can correspond to a wide variety of computing devices, including desktop computing devices, laptop computing devices, terminal devices, mobile phones, tablet computing devices, media players, wearable computing devices (e.g., smart watches, smart eyewear, etc.), and various other electronic computing devices and appliances having one or more computer processors, computer-readable memory and network-access capabilities. Some user devices 102 may be associated with a particular organization 106A-C. For example, an organization may have various user devices 102 that remain on-premises, or that are used off-premises primarily by employees or other users associated with the organization. In some embodiments, some or all of the user devices 102 may be separate from any organization, such as public computers or home computers that are used by any number of users to perform various tasks, which may include accessing applications using credentials associated with a particular organization 106A-C or other customer of the computing resource service provider system 104.

The computing resource service provider system 104 can be a computing system configured to host or otherwise provide access to a managed directory service 140 that manages directories for separate customer organizations 106A-C, applications 142, and/or other network-based services and resources 144. For example, the computing resource service provider system 104 can be a server or group of servers that may be accessed via a communication network 110. The computing resource service provider system 104 can include a number of components to provide various features described herein, such as the managed directory service 140, one or more applications or application servers 142, and other network-based services 144, that can be accessed by organizations 106 and/or user devices 102. The computing resource service provider system 104 may also include various data stores, such as an off-premises directory data store 146 to store directory information for customer organization 106B. In some embodiments, the computing service provider system 104 may include additional or fewer components than illustrated in FIG. 1.

As used herein, the term "off-premises directory" refers to a directory that is remote from the organization with which it is associated, in order to distinguish such a directory from a directory that is located on an organization's premises. Thus, although a directory may be physically stored on the premises of a computing resource service provider system 104, the directory may nevertheless be referred to as an off-premises directory because it is off-premises with respect to the organization to which it belongs (e.g., the organization that owns or operates the network described by the directory). Additionally, although a directory may be physically stored off the premises of the computing resource service provider system 104, the directory may nevertheless be referred to as an on-premises directory because it is on-premises with respect to the organization to which it belongs.

The managed directory service 140 may be accessible by an administrator associated with an organization 106A-C via a user device 102 to manage various aspects of one or more directories associated with the administrator's organization 106A-C. In some embodiments, the managed directory service 140 includes a directory management subsystem 154 that manages the various aspects of the one or more directories associated with the administrator's organization 106A-C. For example, the directory management subsystem 154 can be used to access and/or manage the off-premises directory 146 associated with the organization 106B as well as the on-premises directories 160 associated with the organizations 106A and 106C.

The managed directory service 140 may also provide a variety of services to enable computer systems and/or user devices 102 to access other system resources, such as authentication and/or authorization services. The authentication services may authenticate credentials of a user to determine whether the user is authorized to access the managed directory service 140 and/or the other system resources associated with the managed directory service 140. The credentials may be authenticated by the managed directory service 140, by a process, program, or service under the control of the managed directory service 140, by a process, program, or service that the managed directory service 140 may communicate with, and/or any combination thereof. The authorization services may authorize a user to determine what actions, if any, the user can perform (e.g., creating file systems on a file system resource, destroying file systems on the file system resource, attached to file systems, detaching from file systems, providing access links to file systems, reclaiming access links to file systems, allowing reads from file systems, allowing writes to file systems, etc.).

The managed directory service 140 may additionally include a policy management subsystem 150 that may be configured to allow an administrator associated with an organization 106A-C to select one or more profiles that define remote access to the managed directory service 140, applications 142, other network-based services 144, and/or applications provided by the third-party application servers 108. For example, the administrator, using user device 102, may access the policy management subsystem 150 to allow a user (e.g., an employee of an organization 106A-C) to access a word processing application provided by applications 142 and a virtual computer system service provided by the other network-based services 144 while prohibiting access to other applications and services. As will be described in greater detail below, an administrator, via the user device 102, may interact with a user interface generated by the policy management subsystem 150 to select template or custom policies and assign the selected policies to users or groups of users.

The administrator may also be able to generate and/or modify policies. For example, when an administrator requests to create or modify a policy, the policy management subsystem 150 (or a related service that the policy management subsystem 150 redirects to) may allow the administrator to generate new policies and/or modify existing policies, and the new policies or updated policies may then be provided to the policy management subsystem 150 if generated by a related service such that the administrator can select and assign policies to users or groups of users. In some embodiments, after a new policy is created, the policy management subsystem 150 automatically assigns selected users and/or groups of users to the new policy.

The policy management subsystem 150 may also allow users associated with an organization 160A-C to select one or more policies made available to the user or to the group that the user belongs to by the administrator. The selection may be made after the user's credentials are authenticated and before the user is redirected to the application or the service that the user is attempting to access.

The managed directory service 140 may also include a policy mapping database 152 that stores template policies and/or custom policies and/or mappings of policies to users and/or groups of users. For example, the policy management subsystem 150 may be in communication with the policy mapping database 152 to store policies associated with an organization 106A-C and retrieve the stored policies as well as the mappings when an administrator attempts to manage user and/or group policies or when a user attempts to access an application or service. In other embodiments, not shown, the template policies and/or custom policies and the mappings may be stored in separate databases within the managed directory service 140 that are both accessible by the policy management subsystem 150.

In an embodiment, the policy management subsystem 150 generates a URI to redirect a user device 102 operated by a user to a computer resource service provider interface to access applicable applications or services. The URI may be generated after the user's credentials are authenticated and/or the user has chosen one or more policies. Alternatively, the URI may be generated once an administrator has assigned one or more policies to the user or the group that the user belongs to. The generated URI may allow the user to access the applicable applications or services in accordance with the selected policies. The URI may be transmitted directly to the user device 102 or may be transmitted to the user via an electronic message (e.g., electronic mail, text message, etc.).

When the user uses the URI to access the computing resource service provider interface, the policy management subsystem 150 may determine the policies selected by the user. Based at least in part on these policies, the policy management subsystem 150 may transmit one or more executable instructions to a credential exchange subsystem of the application or service for which access is requested (not shown) to obtain temporary credentials for accessing the applications 142, the other network-based services 144, and/or applications provided by the third-party application servers 108 and/or to define one or more actions the user may undertake within these applications or services. Once the policy management subsystem 150 has obtained these credentials, the policy management subsystem 150 may generate a user-specific computing resource service provider interface and enable the user to access the applications 142, the other network-based services 144, and/or applications provided by the third-party application servers 108 according to the policies selected by the user.

The computing resource service provider system 104 may be a single computing device, or it may include multiple distinct computing devices, such as computer servers, logically or physically grouped together to collectively operate as a server system. The components of the computing resource service provider system 104 can each be implemented as hardware, such as a server computing device, or as a combination of hardware and software. In addition, the components of the computing resource service provider system 104 can be combined on one server computing device or separated individually or into groups on several server computing devices. In some embodiments, the features and services provided by the computing resource service provider system 104 may be implemented as web services consumable via the communication network 110. In further embodiments, the features and services are provided by one more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment.

The organizations 106A-C can correspond to various customers of the computing resource service provider system 104. Although the term "organization" is used herein, the features involving such organizations may additionally or alternatively involve any customer or other entity having a directory (whether on-premises or off-premises) and wishing to use the computing resource service provider system 104 to manage access to the directory by applications hosted by the computing resource service provider system 104 or third-party application servers 108.

Organizations that maintain on-premises directories 160 may have one or more servers on which the directories 160 are stored. For example, organization 106A may have a data center that includes various servers, and an on-premises directory 160 may be stored on one or more of the servers. Organizations that maintain off-premises directories may employ the services of the computing resource service provider system 104, which may store the off-premises directory in an association with the respective organization. For example, organization 106B may not maintain an on-premises directory at all, but may rely instead on the computing resource service provider system 104 to maintain the organization's directory. Some organizations may choose to maintain directories both on-premises and off-premises. For example, organization 106C may store an on-premises directory 160 in a manner similar to organization 106A, described above, and the organization 106C may also choose to employ the computing resource service provider system 104 to maintain a directory. The directory maintained by the computing resource service provider system 104 in this example may be a mirror or subset of the on-premises directory (e.g. for backup or disaster-recovery purposes), or it may be a separate directory altogether (e.g., a directory of computing resources in a different region from the on-premises directory 160).

The communication network 110 may be a publicly accessible network of linked networks, possibly operated by various distinct parties, such as the Internet. In some embodiments, the communication network 110 may be or include the Internet, a private network, personal area network, local area network, wide area network, cable network, satellite network, cellular telephone network, etc. or combination thereof.

Figure 2:
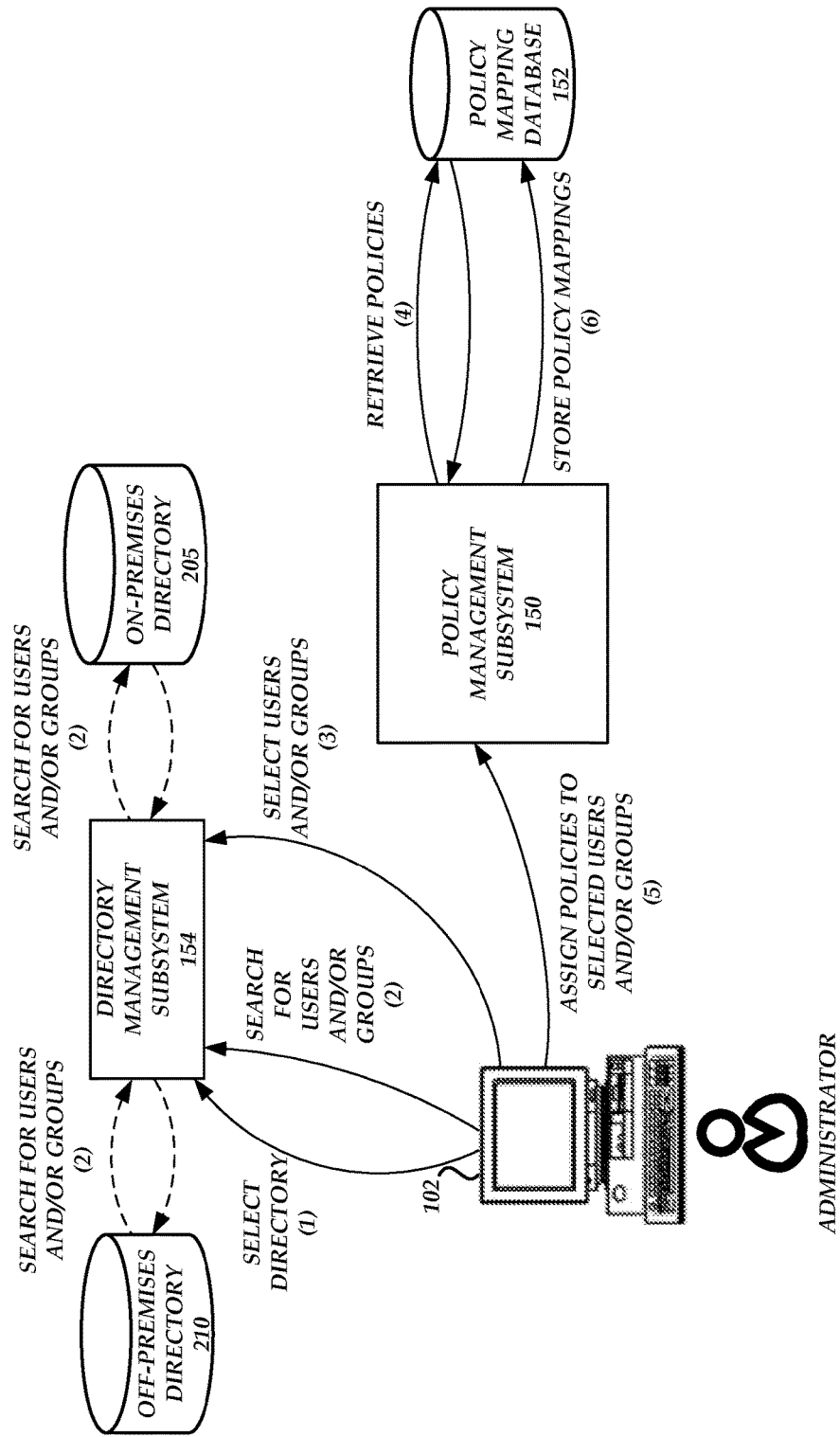
FIG. 2 shows interactions between the various components of FIG. 1 during the process of assigning policies to users and/or groups.

Example Interactions Between Components for Assigning Policies to Users and/or Groups FIG. 2 shows interactions between the user device 102, the policy management subsystem 150, the directory management subsystem 154, on-premises directory 205, off-premises directory 210, and/or the policy mapping database 152 during the process of assigning policies to users and/or groups.

At (1), an administrator using a user device 102 receives a user interface generated by the policy management subsystem 150 or the directory management subsystem 154 that lists one or more directories that are operated by the organization that the administrator is associated with. The administrator can select one or more directories, and the selection is provided to the directory management subsystem 154.

At (2), the user device 102 may request that a search or query of the selected directory or directories be performed to identify users and/or groups according to zero or more parameters provided by the user device 102 (e.g., a name of a user or group). The request may be provided to the directory management subsystem 154, which may contact the selected directory or directories to search for users and/or groups associated with the selected directory or directories according to any parameters provided by the user device 102. For example, the directory management subsystem 154 may search for users and/or groups associated with the on-premises directory 205 (e.g., on-premises directory 160 of FIG. 1) and/or the off-premises directory 210 (e.g., off-premises directory 146 of FIG. 1).

At (3), the policy management subsystem 150 or the directory management subsystem 154 may generate another user interface that displays a list of users and/or groups identified based on the search such that the administrator can make a selection of one or more users and/or groups. For example, the administrator can make the selection to identify the users and/or groups for which policies are to be assigned.

At (4), the policy management subsystem 150 receives the selected users and/or groups (e.g., from the directory management subsystem 154 or from the user device 102) and retrieves policies from the policy mapping database 152. The retrieved policies may include template policies and/or custom policies created by the administrator at a previous time. The retrieved policies may be associated with the selected directory or directories and/or with the organization that the administrator is associated with.

In other embodiments, not shown, the policy management subsystem 154 may retrieve the policies from the policy mapping database 152 prior to the user device 102 searching for and selecting users and/or groups. Thus, the operations associated with (4) may be performed after the operations associated with (1). Following (4), the operations associated with (2) and (3) may be performed. The administrator may also select one or more of the retrieved policies before the operations associated with (2) and (3) are performed.

At (5), the policy management subsystem 150 may generate another user interface that displays a list of the retrieved policies such that the administrator can make a selection of one or more policies. For example, once the selection is made, the policies are assigned to the selected users and/or groups. If the operations associated with (4) are performed before the operations associated with (2) and (3) and the administrator selects one or more of the retrieved policies before selecting the users and/or groups, then the selection of the users and/or groups may cause the selected policies to be assigned to the selected users and/or groups. In some embodiments, the administrator can request to create a new policy before making the selection. If a request to create a new policy is made, the user device 102 may be redirected to a different user interface (e.g., generated by the policy management subsystem 150 or another service) that allows the administrator to define a new policy. Once the new policy is created, the new policy may be automatically displayed in the list of retrieved policies. The administrator may be redirected to the original user interface generated by the policy management subsystem 150 and can select the retrieved policies and/or the new policy. In further embodiments, the selected users and/or groups are automatically assigned to the new policy, which is reflected by the user interface generated by the policy management subsystem 150.

At (6), a mapping of the selected policies to the selected users and/or groups is made and the mapping is stored in the policy mapping database 152. The mappings may be later retrieved by the policy management subsystem 150 when a user associated with the organization uses a user device 102 to access an application or service to allow the user to select one or more policies, as described in greater detail below with respect to FIG. 3.

Example Process for Selecting a Policy to Access an Application or Service

Figure 3:
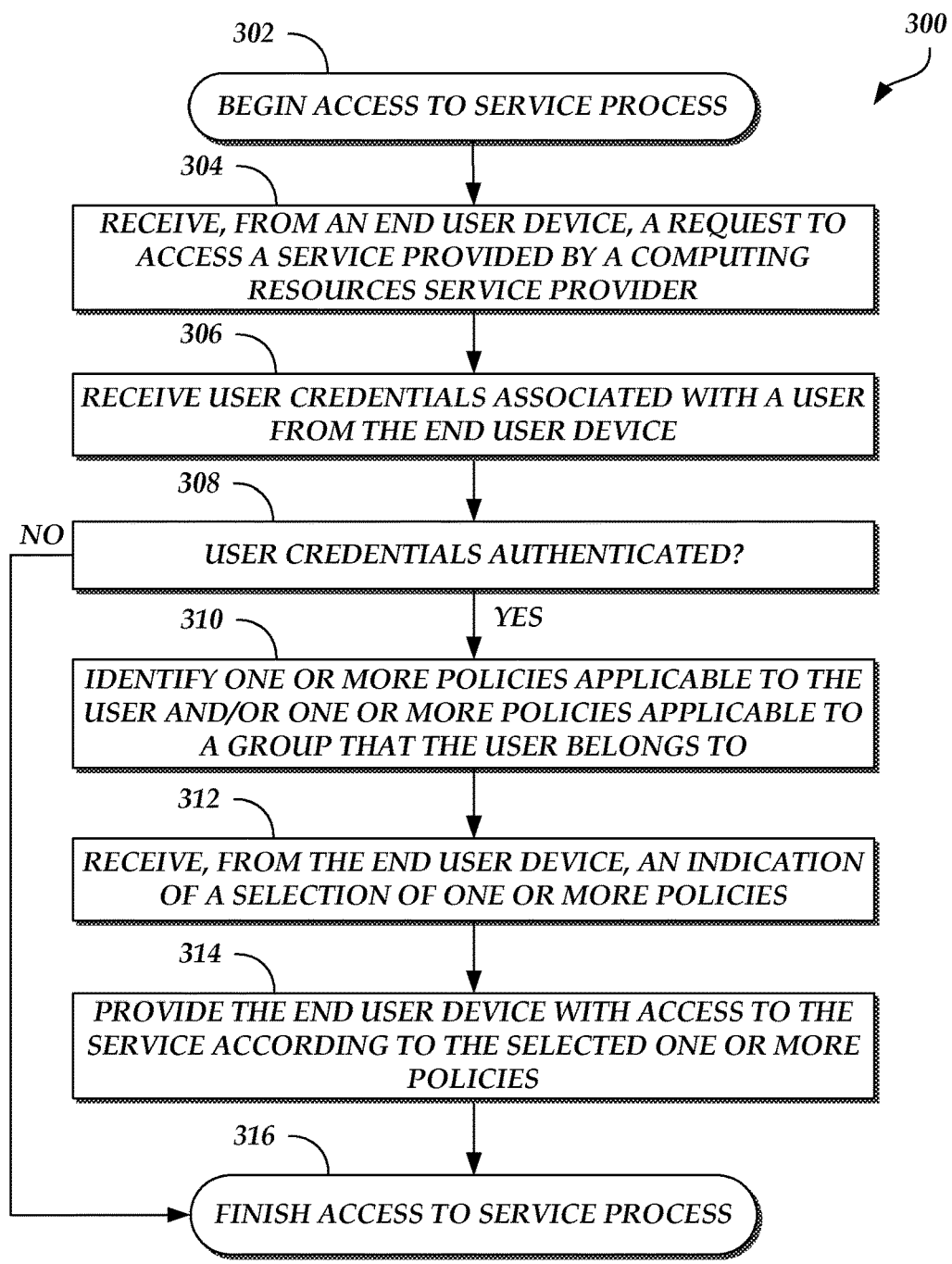
FIG. 3 illustrates a process for selecting a policy to access an application or service.

FIG. 3 illustrates a process 300 for selecting a policy to access an application or service. As an example, the policy management subsystem 150 of FIG. 1 can be configured to execute the selection and access process 300. The policy management subsystem 150 may execute the selection and access process 300 when a user using the user device 102 requests access to an application or service, such as the applications 142, one or more of the other network-based services 144, and/or an application provided by the third-party application servers 108. The selection and access process 300 begins at block 302.

At block 304, a request to access a service provided by a computing resource service provider is received from an end user device. For example, the end user device may be operated by a user associated with an organization, such as the organizations 160A-C.

At block 306, user credentials associated with a user are received from the end user device. The user credentials may include a username and password combination.

At block 308, the selection and access process 300 determines whether the user credentials can be authenticated. For example, a managed directory service may be contacted to perform the authentication. The managed directory service may manage one or more directories operated by the organization to which the user is associated with. If the user credentials can be authenticated, the selection and access process 300 proceeds to block 310. Otherwise, the selection and access process 300 ends at block 316.

At block 310, one or more policies applicable to the user and/or one or more policies applicable to a group that the user belongs to are identified. In an embodiment, the selection and access process 300 may identify a group that the user belongs to by contacting the managed directory service. Because group membership is dynamic, the policy management subsystem 150 may not directly store the group membership. Rather, the group membership may be identified by directly accessing (e.g., reading) the directory to which the user belongs. Once the groups to which the user belongs is identified, the selection and access process 300 can retrieve policies associated with the identified groups and/or policies identified with the user from the policy mapping database 152. A selectable list of the policies may be presented to the user.

At block 312, an indication of a selection of one or more policies is received from the end user device. In an embodiment, the user can select multiple policies, thereby reducing the administrative burden on administrators tasked with creating policies for the users of an organization. For example, the policies generated by the administrators may be less complex as an administrator may not have to create long, multifaceted policies to account for every possible combination of rules for the users of an organization and/or update the policies as the roles of users change.

At block 314, the end user device is provided with access to the service according to the selected one or more policies. Once the policies are selected, the end user device may be automatically redirected (e.g., via a URI) to a page that provides access to the service. After the end user device is provided with access to the service, the selection and access process 300 may be complete, as shown in block 316.

Example User Interface for Assigning Policies

Figure 4A:
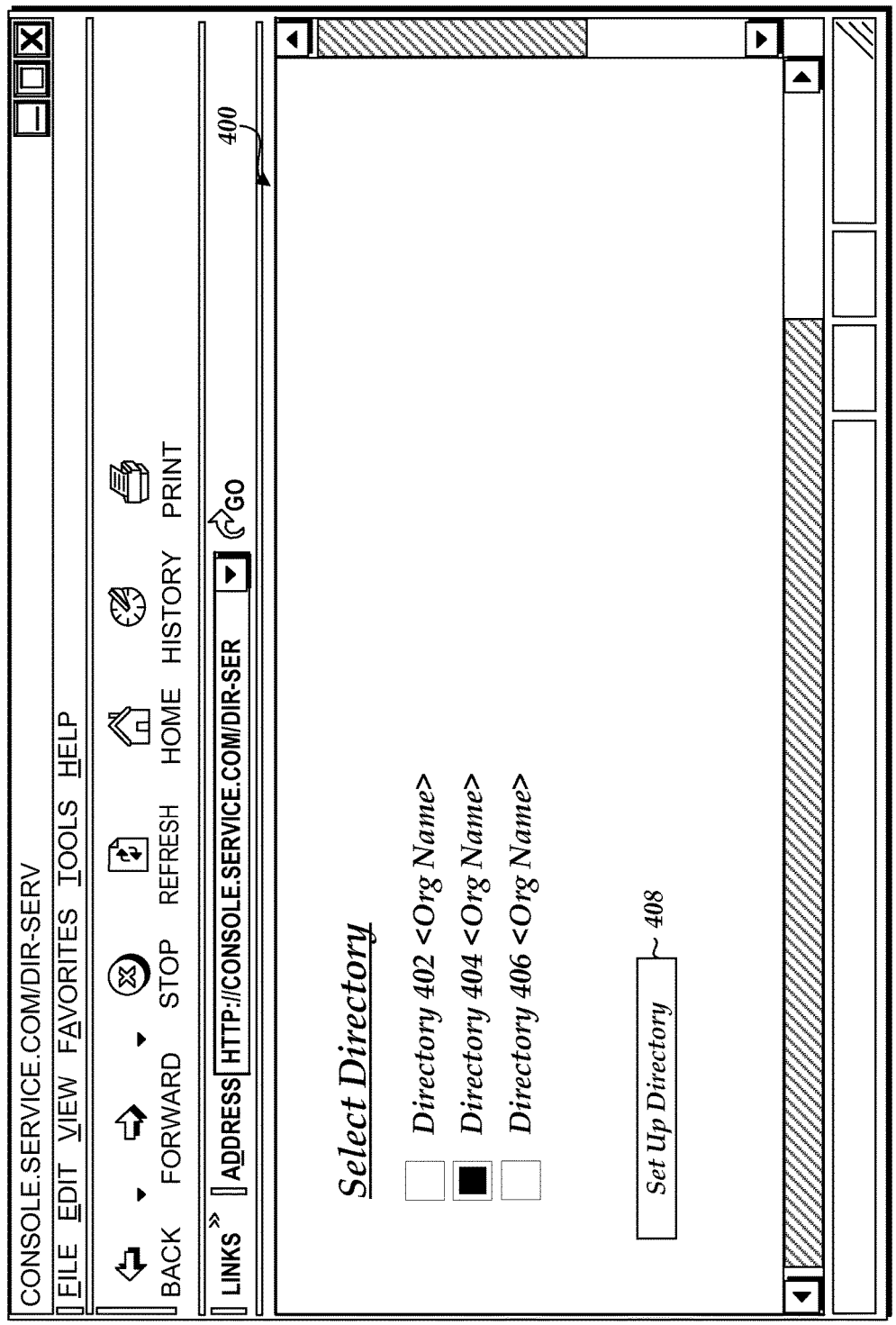
FIGS. 4A-D illustrate an example of a representation of a network page viewed on a user device, such as the user device, operated by an administrator of an organization.

FIGS. 4A-D illustrate an example of a representation of a network page 400 viewed on a user device, such as the user device 102, operated by an administrator of an organization. The network page 400 may be generated by the policy management subsystem 150 and displayed within the user interface of a browser application executed by the user device 102. As illustrated in FIG. 4A, the network page 400 allows the administrator to select one or more directories 402, 404, and/or 406 from which associated users and/or groups will be assigned policies. As an example, the administrator may select directory 404 and click on set up directory button 408 to proceed. Once one or more directories are selected, the network page 400 may request the administrator to confirm that users associated with the selected directories should be able to access the computing resource service provider. Once confirmed, the network page 400 may request the administrator to select one or more users and/or groups.

Figure 4B:
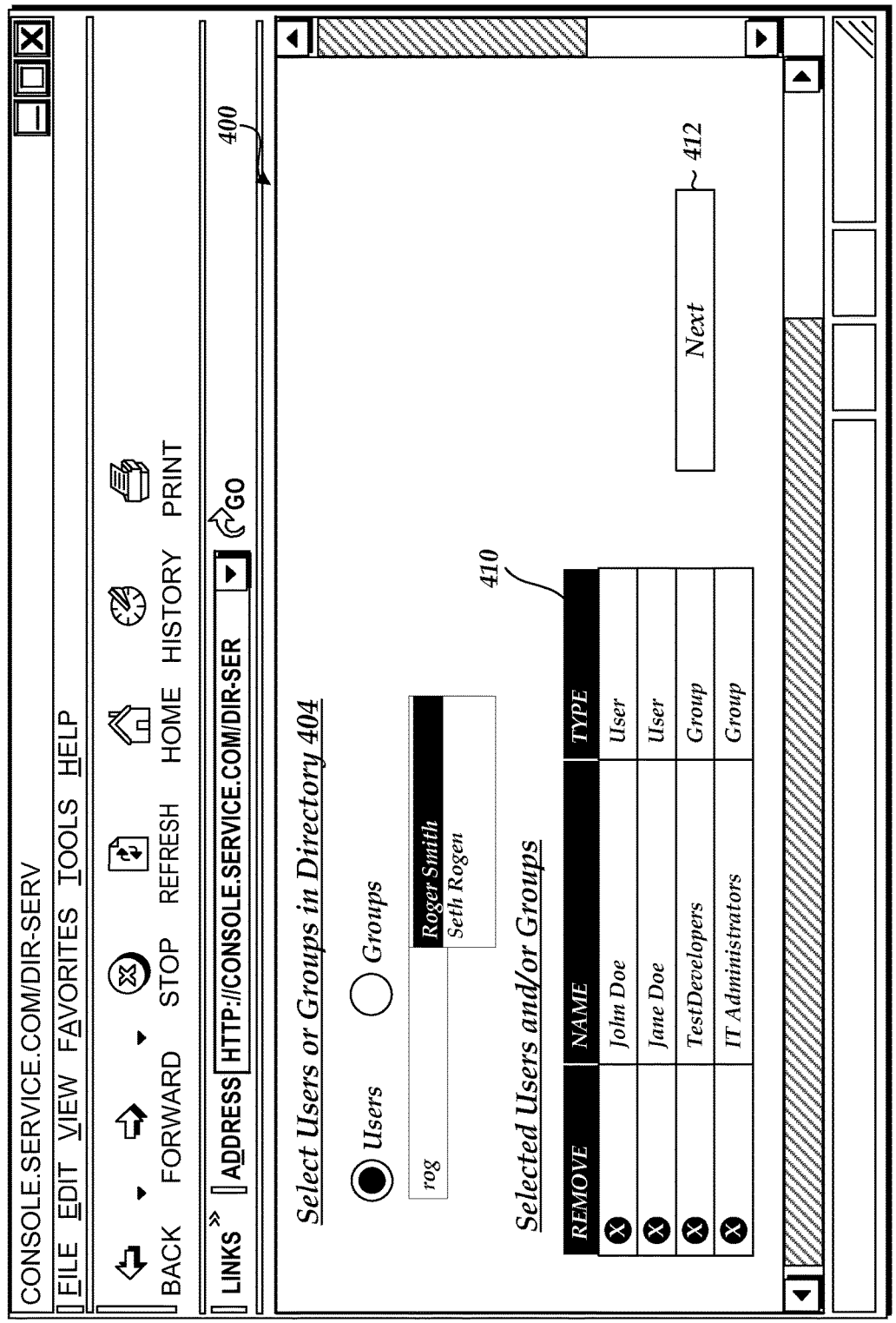

As illustrated in FIG. 4B, the network page 400 includes content that allows the administrator to select one or more users and/or groups. A list of the users and/or groups that have already been selected is presented in table 410. The list identifies the user and/or group and whether the entity is a user or a group. In an embodiment, the administrator can remove any user and/or group from the selection. Once the administrator has finalized the selection of users and/or groups, the administrator can select next button 412 to proceed.

Figure 4C:
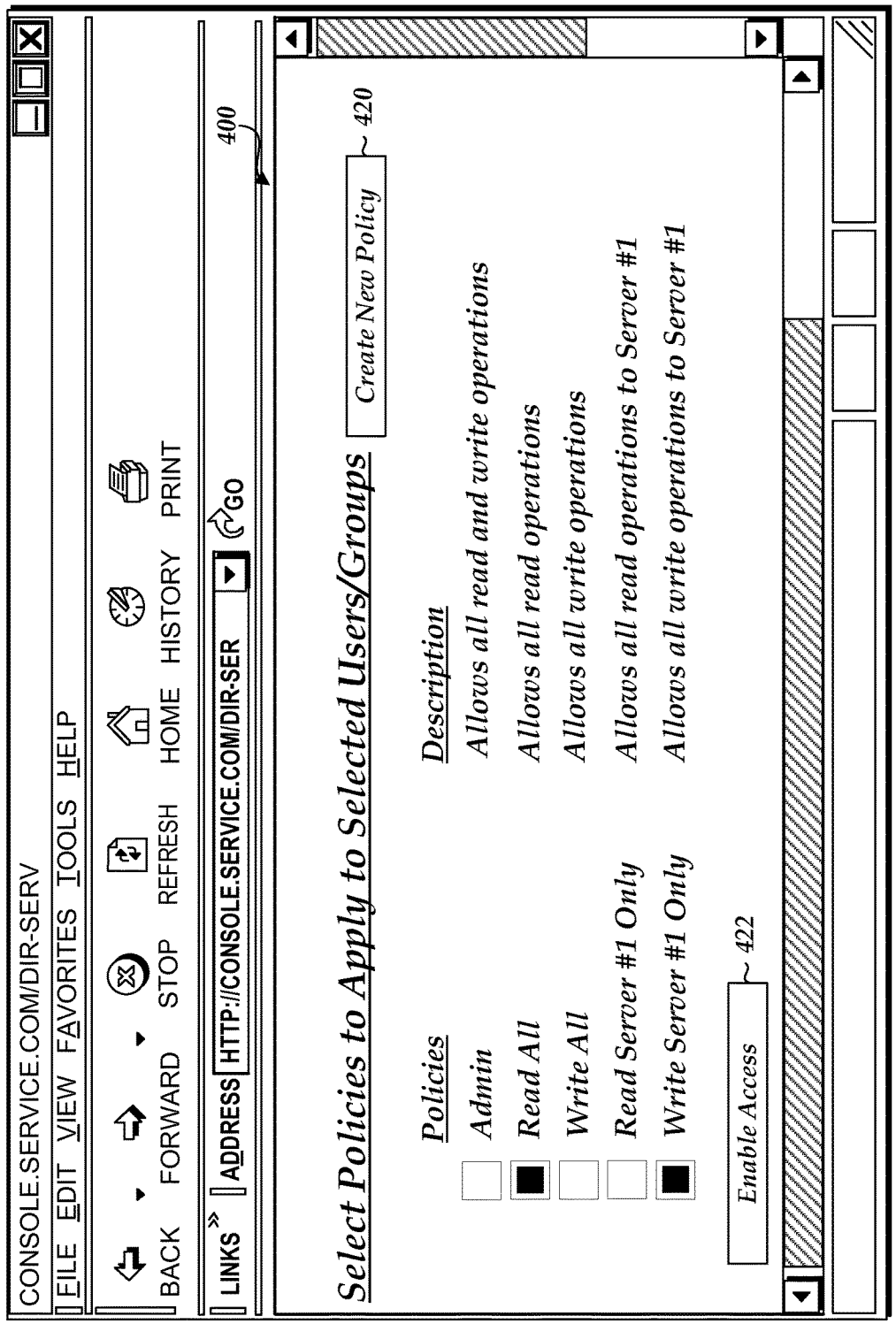

As illustrated in FIG. 4C, once the administrator has selected the next button 412, the network page 400 may include a list of policies, a description of the policies (e.g., what rules are implemented by each policy), and the ability to select one or more policies. In an embodiment, selecting a policy assigns the policy to the users and/or groups previously selected. Assigning policies may allow the selected users and/or the users that are members of the selected groups the option of choosing one or more of the assigned policies when accessing an application or service. As an example, the administrator may select the read all policy and the write server #1 only policy.

In some embodiments, the listed policies are associated with template policies or custom policies created at a previous time. The administrator may have the option of creating a new policy not already listed by selecting create new policy button 420. When the create new policy button 420 is selected, the browser application may be redirected to a network page that provides a mechanism for generating custom policies. The network page may allow the administrator to name the policy and set the rules associated with the policy, modify an existing policy, and/or delete an existing policy. Once the administrator has created the policy, modified an existing policy, and/or deleted an existing policy, the browser application may be redirected to the network page 400 of FIG. 4C, where the list of policies may be automatically updated accordingly. In further embodiments, if the administrator creates a new policy, the list of policies is updated to include the new policy and the policy management subsystem 150 automatically assigns the selected users and/or groups to the new policy, which may be indicated in the network page 400 of FIG. 4C.

Figure 4D:
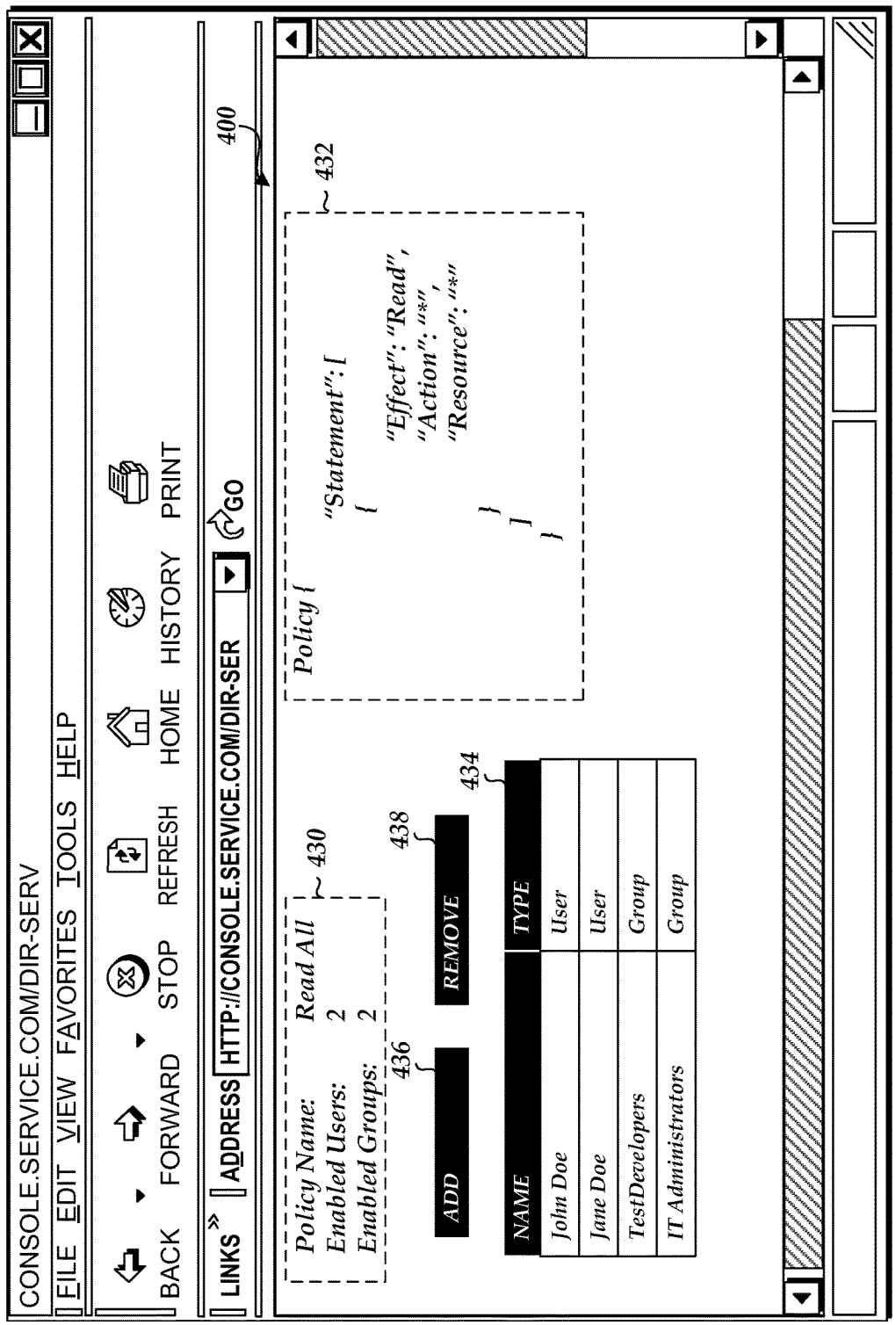

As illustrated in FIG. 4D, once one or more policies are selected, the network page 400 provides information on a selected policy and indicates that the selected users and/or groups have been assigned to the policy. For example, box 430 identifies the policy and the number of users and groups assigned to the policy. Box 432 identifies the rules that define the policy associated with the policy. Table 434 includes a list of the users and groups associated with the policy.

In an embodiment, the administrator can add additional users and/or groups to the policy via add button 436. Selecting the add button 436 may redirect the browser application to a network page similar to the network page 400 of FIG. 4B. The network page to which the browser application is redirected may identify the policy (e.g., the read all policy) and allow the administrator to select users and/or groups associated with the directory 404 for addition to the policy. Once the selection is made, the browser application may be redirected back to the network page 400 of FIG. 4D, where the network page 400 is updated to include the updated list of users and/or groups assigned to the policy. The administrator may further remove users and/or groups from the policy via remove button 438.

Example User Interface for Selecting Policies

Figure 5A:
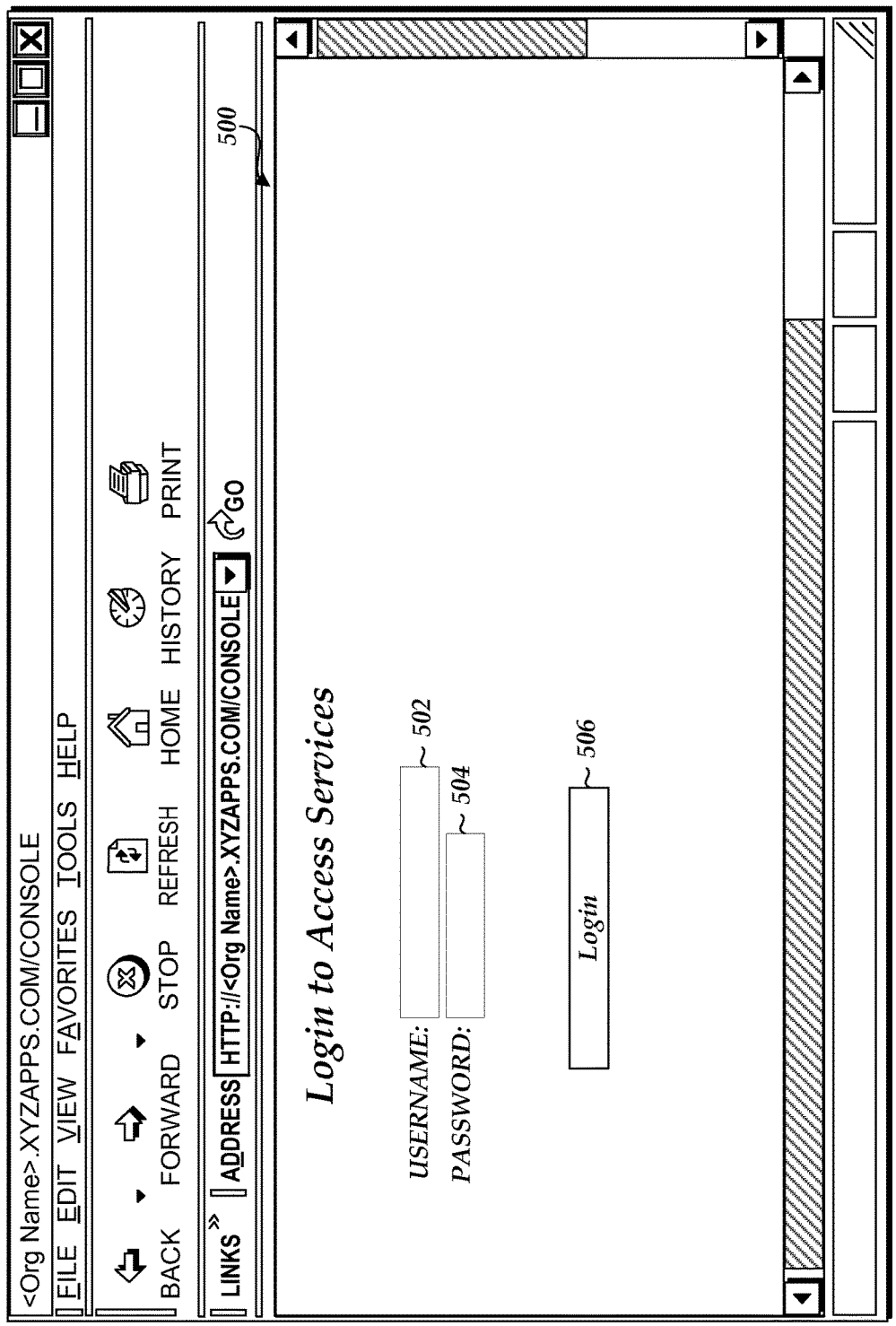
FIGS. 5A-C illustrate an example of a representation of a network page viewed on a user device, such as the user device, operated by a user associated with an organization.
Figure 5B:
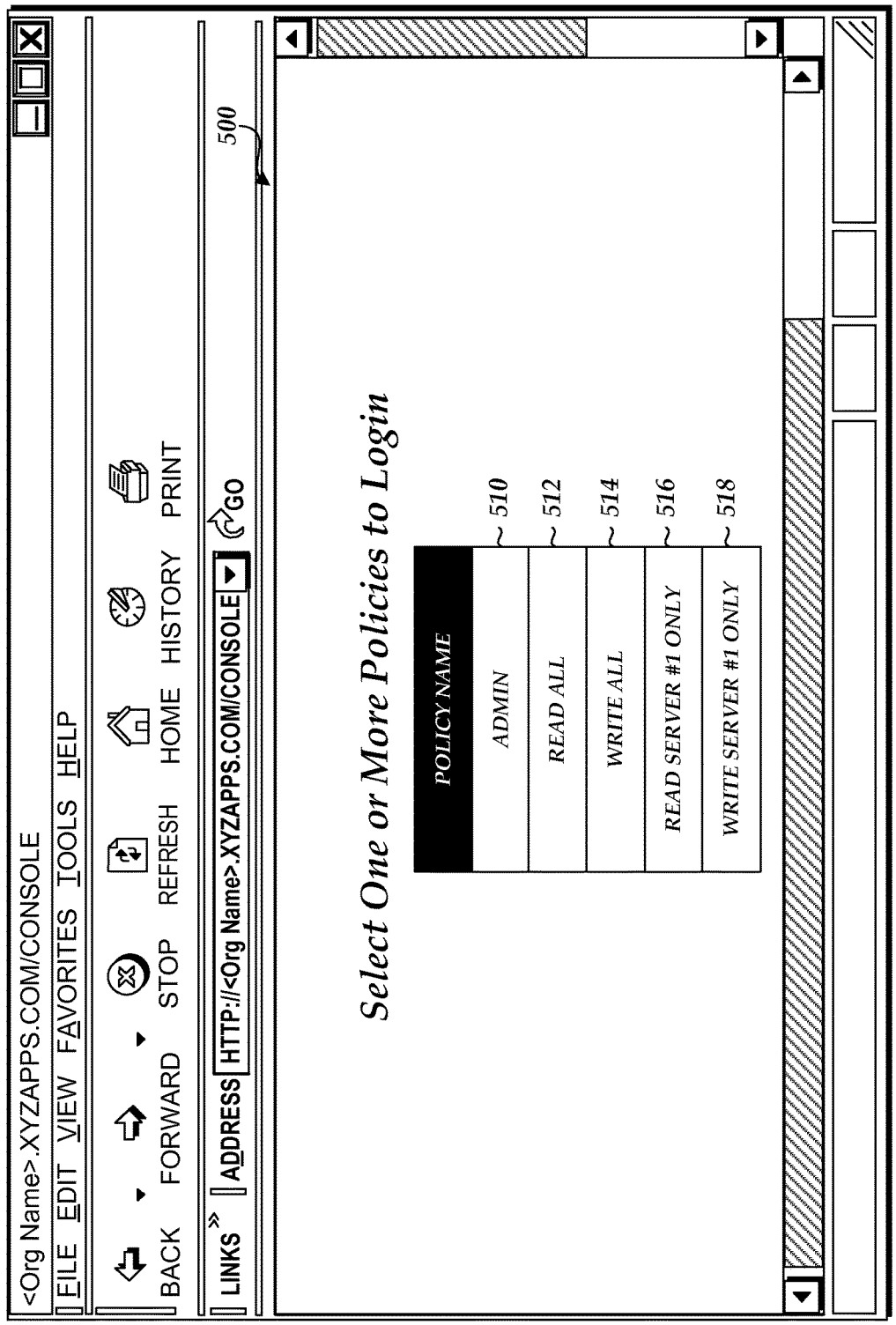
Figure 5C:
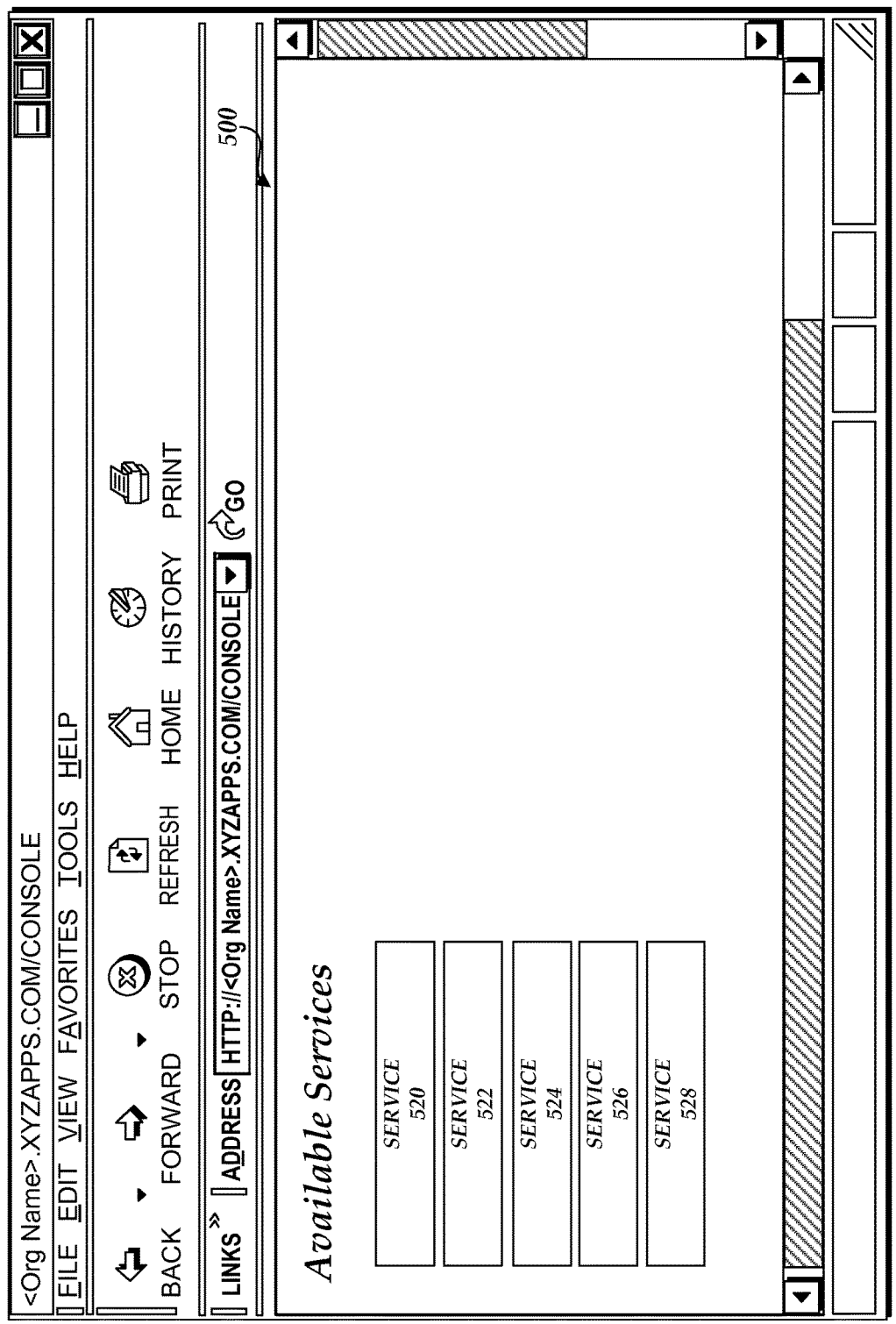

FIGS. 5A-C illustrate an example of a representation of a network page 500 viewed on a user device, such as the user device 102, operated by a user associated with an organization. The network page 500 may be generated by the policy management subsystem 150 and displayed within the user interface of a browser application executed by the user device 102. As illustrated in FIG. 5A, the network page 500 allows the user to provide his or her credentials. For example, the user may provide his or her username in field 502 and his or her password in field 504. The credentials may be authenticated after the user selects login button 506.

If the credentials can be authenticated (e.g., by the managed directory service 140), the user is asked to select one or more policies. As illustrated in FIG. 4B, the network page 500 displays a list of policies 510, 512, 514, 516, and 518 once the credentials are authenticated. The user may select any number of the policies 510, 512, 514, 518, and/or 518.

Once the user selects one or more policies 510, 512, 514, 518, and/or 518, the network page 500 displays a list of services that are available to the user according to the policy or policies chosen by the user, as illustrated in FIG. 5C. For example, services 520, 522, 524, 526, and 528 may be available to the user based on the policies selected by the user.

Terminology

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, and/or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid state memory chips and/or magnetic disks, into a different state. In some embodiments, the computer system may be a cloud-based computing system whose processing resources are shared by multiple distinct business entities or other users.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on general purpose computer hardware, or combinations of both. To clearly illustrate this interchangeability of hardware and software, various illustrative components, blocks, modules, and steps have been described above generally in terms of their functionality. Whether such functionality is implemented as specialized hardware versus software running on general-purpose hardware depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a general purpose processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:
1. A computer-implemented method, comprising:
as implemented by a policy management subsystem of a directory service, the directory service and policy management subsystem hosted by a first computing resource service provider system that comprises one or more computing devices configured with specific executable instructions, receiving, from an end user device, a request to access an executable application hosted by a second computing resource service provider system, the second computing resource service provider system located in a different region than the policy management subsystem, wherein access to the executable application is managed by a directory of the directory service;

receiving user credentials associated with a user from the end user device;

attempting to authenticate the user credentials;

identifying, in response to authentication of the user credentials, one or more policies applicable to the user and one or more policies applicable to a group to which the user belongs, wherein the identified policies specify which applications, of a plurality of applications managed by the directory service, the user is authorized to cause to be executed;

receiving, from the end user device, an indication of a selection of one or more policies from the identified policies;

transmitting, to a credential exchange subsystem of the second computing resource service provider system, a request for temporary credentials, wherein the temporary credentials enable the user to initiate execution of the executable application;

receiving the temporary credentials from the credential exchange subsystem; and providing the end user device with access to the executable application based on the received temporary credentials and according to the selected one or more policies.

2. The computer-implemented method of claim 1, wherein attempting to authenticate the user credentials comprises:

transmitting a request to the directory service to authenticate the user credentials; and receiving results of an authentication performed by the directory service.

3. The computer-implemented method of claim 1, wherein identifying one or more policies applicable to a group to which the user belongs comprises:

identifying a first group associated with the user in the directory; and querying a policy mapping database to identify one or more policies associated with the first group.

4. The computer-implemented method of claim 3, wherein the user credentials comprise a username and a password stored in the directory.

5. The computer-implemented method of claim 1, wherein identifying one or more policies applicable to the user and one or more policies applicable to a group to which the user belongs comprises querying a policy mapping database that includes a mapping of users and groups to policies.

6. The computer-implemented method of claim 5, wherein the policy mapping database includes a first policy and a second policy that are mapped to the user or the group.

7. A system comprising:

a directory service hosted by a first computing resource service provider system, the directory service comprising:

a policy mapping database configured to store policies and mappings of policies to users and groups; and a policy management subsystem comprising one or more computing devices, the policy management subsystem in communication with the policy mapping databases;

wherein the policy management subsystem is configured to execute program instructions that direct the policy management subsystem to:

receive, from an end user device, a request to access an executable application hosted by a second computing resource service provider system, the second computing resource service provider system located in a different region than the policy management subsystem, wherein access to the executable application is managed by a directory of the directory service;

receive user credentials associated with a user from the end user device;

attempt to authenticate the user credentials;

identify, in response to authentication of the user credentials, one or more policies applicable to the user and one or more policies applicable to a group to which the user belongs based on data in the policy mapping database, wherein the identified policies specify which applications, of a plurality of applications managed by the directory service, the user is authorized to cause to be executed;

receive, from the end user device, an indication of a selection of one or more policies from the identified policies;

request temporary credentials from a subsystem of the second computing resource service provider system, wherein the temporary credentials enable the end user device to initiate execution of the executable application; and provide the end user device with access to the executable application according to the selected one or more policies.

8. The system of claim 7, wherein the program instructions further direct the policy management subsystem attempt to authenticate the user credentials by requesting the directory service to authenticate the user credentials based on data present in the directory.

9. The system of claim 7, wherein the program instructions further direct the policy management subsystem to:

identify a first group associated with the user in the directory; and query the policy mapping database to identify one or more policies associated with the first group.

10. The system of claim 9, wherein the user credentials comprise a username and a password stored in the directory.

11. The system of claim 7, wherein the program instructions further direct the policy management subsystem to query the policy mapping database for policies that are mapped to the user and the group to identify the one or more policies applicable to the user and the one or more policies applicable to the group.

12. The system of claim 11, wherein the policy mapping database includes a first policy and a second policy that are mapped to the user or the group.

13. The system of claim 7, wherein the program instructions further direct the policy management subsystem to generate a uniform resource identifier of a user interface that provides access to the executable application.

14. A non-transitory computer storage system comprising a non-transitory storage device, said computer storage system having stored thereon executable program instructions that are configured to be executed by a first computing resource service provider system that hosts a directory service, the directory service including a policy management subsystem, wherein the program instructions direct the first computing resource service provider system to at least:

receive, from an end user device, a request to access an executable application hosted by a second computing resource service provider system, the second computing resource service provider system located in a different region than the first computing resource service provider system, wherein access to the executable application is managed by a directory of the directory service;

receive user credentials associated with a user from the end user device;

attempt to authenticate the user credentials;

identify, in response to authentication of the user credentials, two or more policies applicable to a group to which the user belongs, wherein the identified policies specify which applications, of a plurality of applications managed by the directory service, the user is authorized to cause to be executed;

receive, from the end user device, an indication of a selection of one or more policies from the identified policies;

request temporary credentials from a subsystem of the second computing resource service provider system; and provide the end user device with access to the executable application according to the selected one or more policies.

15. The non-transitory computer storage system of claim 14, wherein the executable program instructions further direct the first computing resource service provider system to at least:

identify a first policy applicable to the user based on a query to a policy mapping database that includes mappings of policies to users and groups; and receive, from the end user device, an indication of a selection of the first policy.

16. The non-transitory computer storage system of claim 15, wherein the executable program instructions further direct the first computing resource service provider system to at least provide the end user device with access to the executable application according to the first policy.

17. The non-transitory computer storage system of claim 14, wherein the executable program instructions further direct the first computing resource service provider system to generate a uniform resource identifier of a user interface that provides access to the executable application.

18. The non-transitory computer storage system of claim 14, wherein the executable program instructions further direct the first computing resource service provider system to at least:

identify a first group and a second group associated with the user in the directory; and query a policy mapping database to identify one or more policies associated with the first group and one or more policies associated with the second group.

19. The non-transitory computer storage system of claim 18, wherein the user credentials comprise a username and a password stored in the directory.

20. The non-transitory computer storage system of claim 14, wherein the executable program instructions further direct the first computing resource service provider system to at least query a policy mapping database that includes a mapping of users and groups to policies to identify the one or more policies applicable to the group.

* * * * *

UNITED STATES PATENT AND TRADEMARK OFFICE
CERTIFICATE OF CORRECTION

PATENT NO. : 10,257,184 B1
APPLICATION NO. : 14/500432
DATED : April 9, 2019
INVENTOR(S) : Mehta et al.

Page 1 of 1

It is certified that error appears in the above-identified patent and that said Letters Patent is hereby corrected as shown below:

In the Claims

In Column 16, Line 4, change "databases" to --database--.

Signed and Sealed this
Sixth Day of August, 2019

Andrei Iancu
*Director of the United States Patent and Trademark Office*